United States Patent [19]

Jones

[11] Patent Number: 4,861,055

[45] Date of Patent: Aug. 29, 1989

[54] DRIVE MECHANISM

[76] Inventor: Micheal D. Jones, 3641 S.E. Lambert, Portland, Oreg. 97202

[21] Appl. No.: 130,304

[22] Filed: Dec. 9, 1987

[51] Int. Cl.<sup>4</sup> .................. B62M 1/04; B62M 1/08; B62M 1/12; B62M 1/16

[52] U.S. Cl. .................. 280/234; 74/132; 280/245; 280/254

[58] Field of Search ............ 280/242 R, 233, 234, 280/244, 245, 246, 247, 248, 253, 255, 256, 257, 258, 263, 265, 270; 74/126, 130–135

[56] References Cited

U.S. PATENT DOCUMENTS

| | | | |
|---|---|---|---|
| 25,550 | 9/1859 | Underhill | 74/132 |
| 98,092 | 12/1869 | Neale | 74/132 |
| 375,755 | 1/1888 | Kidder | 280/231 |
| 581,985 | 5/1897 | Fritz | 280/245 |
| 609,498 | 8/1898 | Campbell | 74/132 |
| 657,943 | 9/1900 | Kimball | 60/505 |
| 926,131 | 6/1909 | McGowan | 280/245 |
| 1,154,208 | 9/1915 | Rundle | 74/131 |
| 1,219,287 | 3/1917 | Goben | 74/132 |
| 1,368,066 | 2/1921 | Starr | 280/285 |
| 1,439,465 | 12/1922 | Callaghan | 280/245 |
| 1,455,124 | 5/1923 | Swinland | 280/245 |
| 1,595,857 | 8/1926 | Coffman | 280/234 |
| 1,604,888 | 10/1926 | Dews | 280/254 |
| 1,620,926 | 3/1927 | Trullinger | 280/234 |
| 2,114,648 | 3/1978 | Seul | 280/236 |
| 2,198,942 | 4/1940 | Leggitt | 280/248 |
| 3,895,825 | 7/1975 | Sink | 280/234 |

FOREIGN PATENT DOCUMENTS

| | | | |
|---|---|---|---|
| 658935 | 6/1929 | France | 280/245 |
| 75247 | 2/1954 | Netherlands | 280/254 |
| 82992 | 3/1919 | Switzerland | 280/245 |
| 1413844 | 11/1975 | United Kingdom | 280/244 |

Primary Examiner—Mitchell J. Hill
Attorney, Agent, or Firm—Kolisch, Hartwell & Dickinson

[57] ABSTRACT

A drive mechanism for a human-powered vehicle is disclosed. The vehicle has a frame, plural wheels and linear motion generating mechanism, which is operable by a human being, for generating substantially linear, oscillating motion. A motion converting device is provided for converting the oscillating motion into rotary motion. A mechanism for transmitting the rotary motion to the driving wheels is provided.

15 Claims, 3 Drawing Sheets

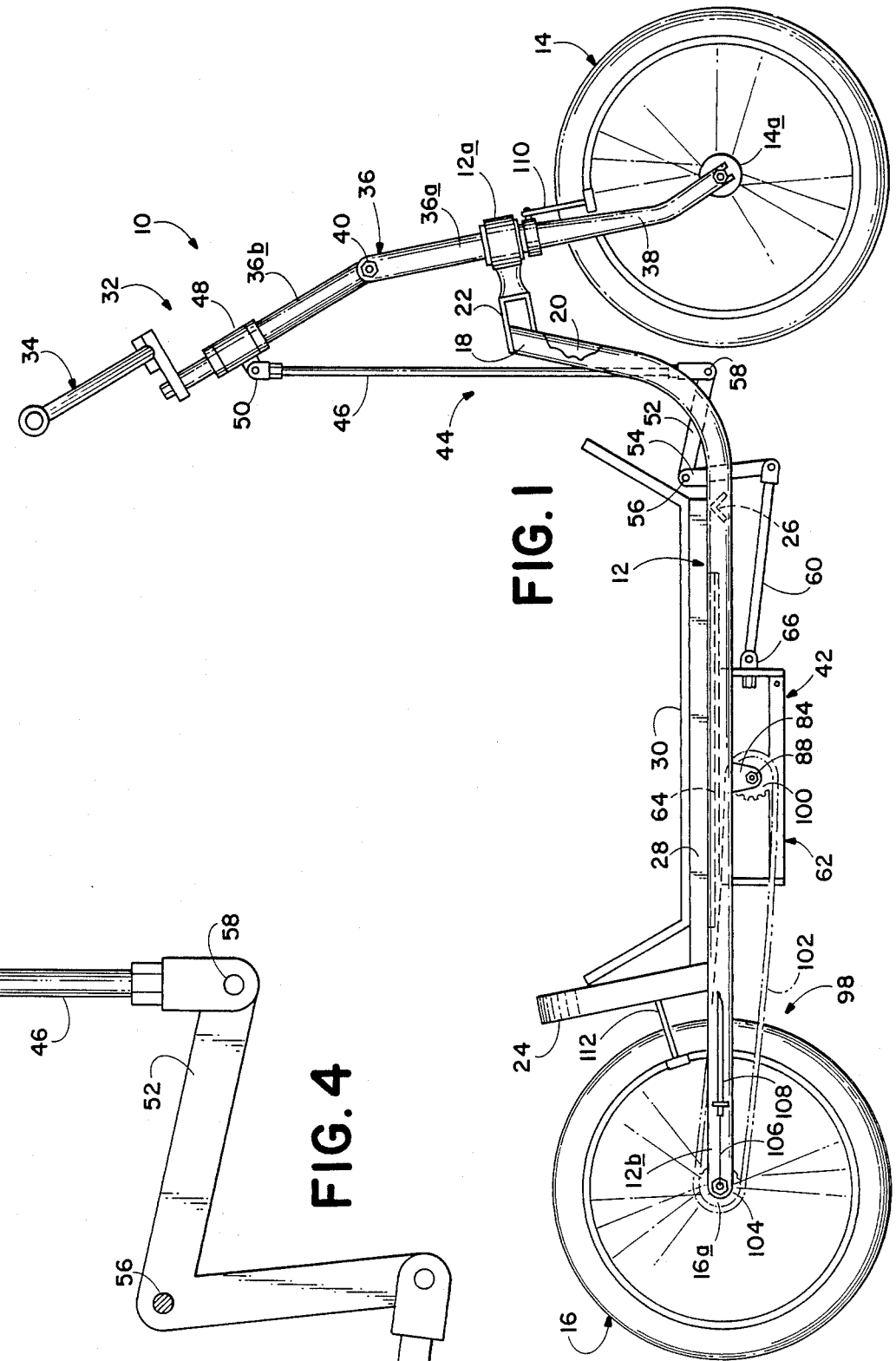

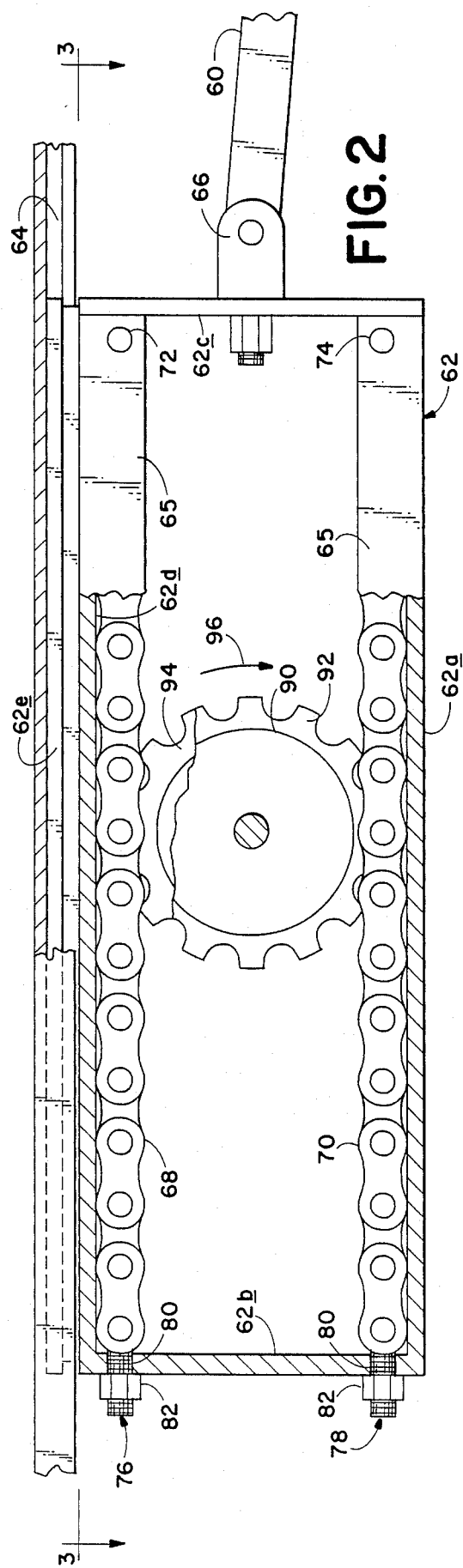
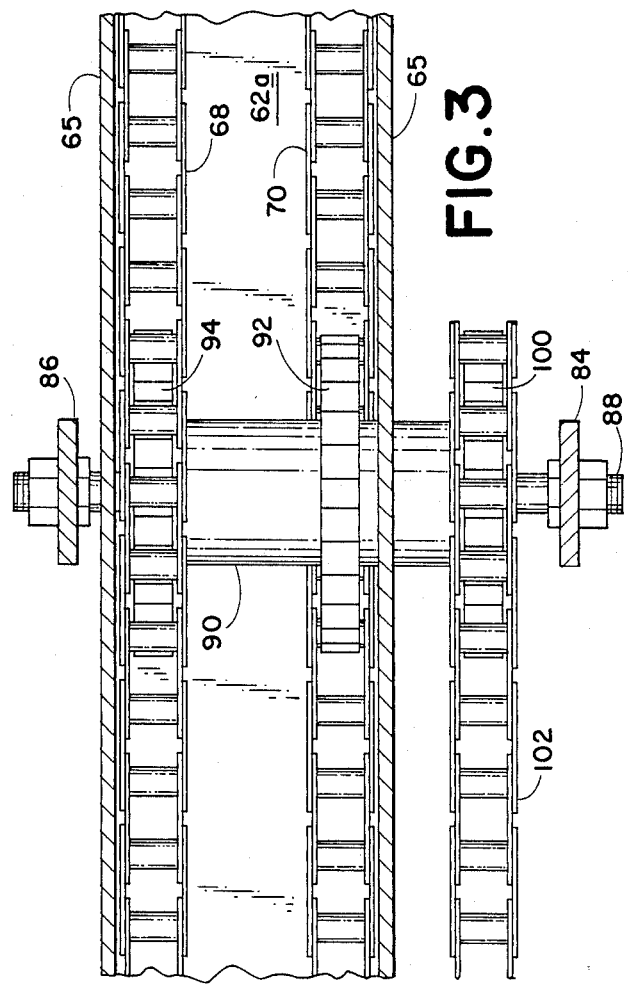

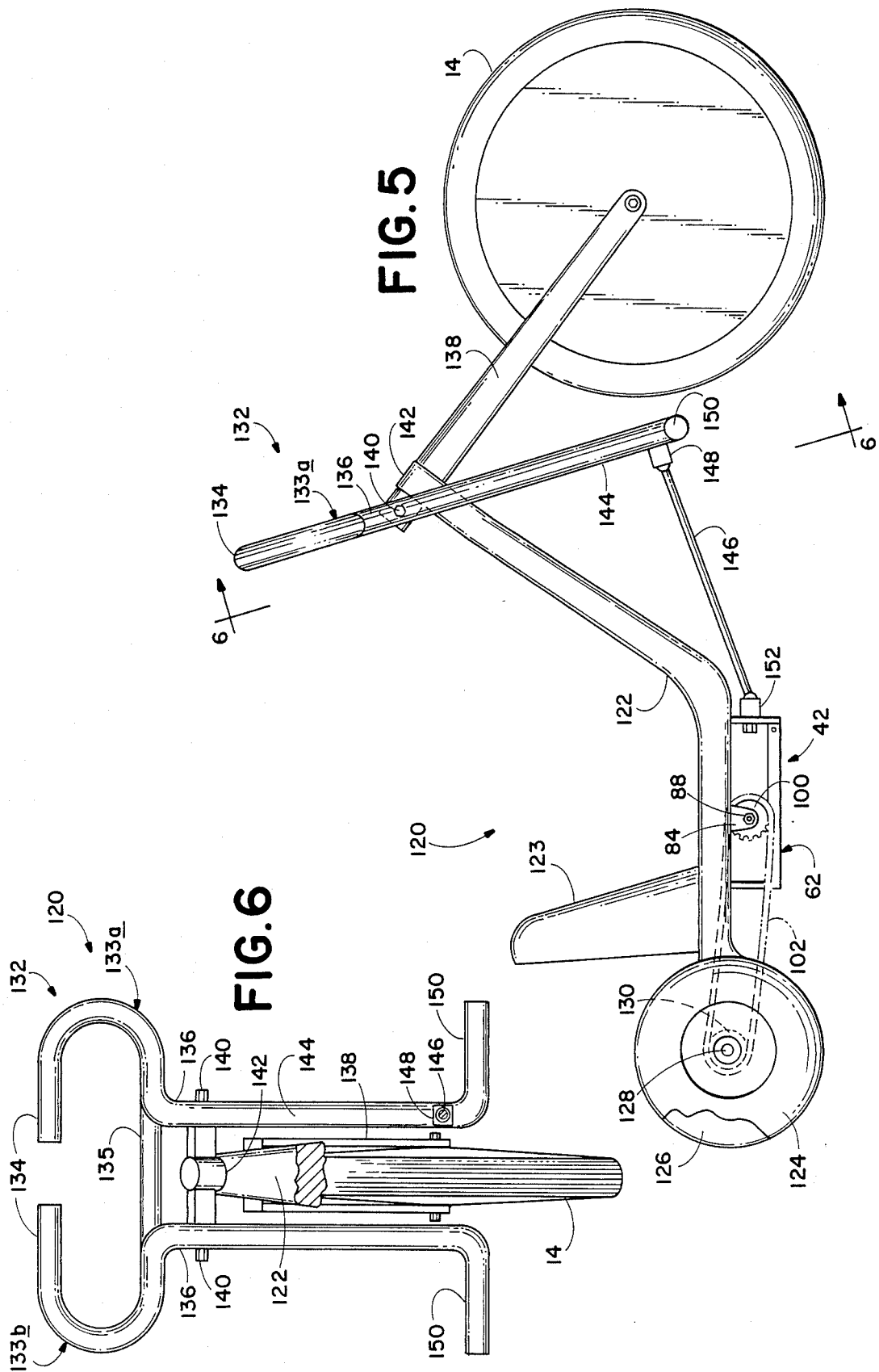

DRIVE MECHANISM

TECHNICAL FIELD

This invention relates to drive mechanisms for use in human-powered vehicles.

BACKGROUND

Numerous forms of drive mechanisms for human-powered vehicles are known. Perhaps the most widely used is that found in a conventional bicycle wherein the rider provides power for the vehicle by producing rotary motion with his feet on a pedal/crank arrangement. The rotary force so produced is transferred to a driving wheel of the vehicle by means of a bicycle chain. Various forms of gear selection mechanisms may be interposed between the crank and the driving wheel and the vehicle itself may be provided with one or more wheels attached to a frame.

Drive mechanisms utilizing ratcheting gears to produce or transmit alternate driving forces to a driving wheel are also known and have been disclosed in references, such as U.S. Pat. No. 98,092, U.S. Pat. No. 1,154,208, U.S. Pat. No. 2,114,648, and U.S. Pat. No. 4,077,648.

DISCLOSURE OF THE INVENTION

The drive mechanism of the instant invention is intended for use in a human-powered vehicle wherein the vehicle has a frame, plural wheels mounted on the frame, wherein at least one of the wheels is a steerable wheel and at least one of the wheels is a driving wheel. The mechanism includes linear motion generating means, which is operable by a human being, for generating a substantially linear, oscillating motion, motion converting means for converting the oscillating motion into rotary motion and means for transmitting the rotary motion to the driving wheel.

One form of the invention provides a drive mechanism which is suitable for use on a vehicle such as a scooter, while a second form of the invention is suitable for use on a vehicle, such as a bicycle or tricycle, wherein the rider is seated on the vehicle.

An object of the instant invention is to provide a drive mechanism for use on a human-powered vehicle.

Another object of the instant invention is to provide a drive mechanism which is hand-powered.

A further object of the instant invention is to provide a drive mechanism which is powered by both the rider's hands and feet.

Still another object of the instant invention is to provide a vehicle which converts oscillating motion into rotary motion.

Another object of the instant invention is to provide a drive mechanism wherein a linear motion generating means is connected to and operable with a steerable wheel.

A further object of the instant invention is to provide a drive mechanism which is inexpensive and easy to manufacture, and which is easy to operate and which provides an efficient transfer of energy from the rider to the vehicle.

These and other objects and advantages of the instant invention will become more fully apparent as the description which follows is read in conjunction with the drawings.

BRIEF DESCRIPTION OF THE DRAWINGS

FIG. 1 is a side plan view of a human-powered vehicle constructed according to the invention.

FIG. 2 is a greatly enlarged, side plan view of motion converting means of the invention, with portions broken away to show detail.

FIG. 3 is a top view of motion converting means, taken generally along the line 3—3 of FIG. 2.

FIG. 4 is an enlarged, partial side plan view of linkage means of the invention.

FIG. 5 is a second embodiment of a human-powered vehicle constructed according to the invention.

FIG. 6 is a sectional rear view of the vehicle of FIG. 5, taken generally along line 6—6 of FIG. 5.

BEST MODE OF CARRYING OUT THE INVENTION

Turning now to the drawings, and initially referring to FIG. 1, a vehicle constructed according to the invention is shown generally at 10. Vehicle 10 includes an elongate frame 12 which has plural wheels 14, 16 mounted thereon. In the embodiment shown in FIG. 1, wheel 14 is a steerable wheel and is mounted at the front end 12a of frame 12, while wheel 16 is a driving wheel and is mounted at the rear end 12b of frame 12. Wheels 14 and 16 have hubs 14a, 16a, located at the center thereof, respectively.

Frame 12 in the preferred embodiment, is of tubular construction and includes a first, or right side longitudinally extending tube 18 and a second, or left side longitudinally extending tube 20. The tubes are fastened adjacent end 12a by a header 22. The tubes extend rearward and are joined adjacent end 12b by a cross member 24, which also serves as a guard for wheel 16. A front cross piece 26 extends between tubes 18 and 20 adjacent the forward end of the frame. A raised platform 28 extends between the tubes to provide rigidity and also to provide a base for a foot board 30, which the rider stands upon to operate the vehicle.

The vehicle includes linear motion generating means, shown generally at 32. In this form of the invention, linear motion generating means include handle bar, or handle bar means, 34 which is mounted on a handle bar support 36. Support 36 is constructed to allow oscillatory motion of handle bar 34 relative to frame 12.

Handle bar support 36 includes a lower portion 36a which is rotatably mounted through header 22 and which includes the usual front fork 38 found on two wheeled vehicles and which is connected to steerable wheel 14.

Handle bar support 36 also includes an upper portion 36b which is connected to portion 36a by an articulated joint 40 which allows motion of portion 36b relative to lower portion 36a.

The substantially linear motion generated through linear motion generating means 32 is converted to rotary motion by motion converting means, shown generally at 42.

Generating means 32 is connected to converting means 42 by linkage means, shown generally at 44. In this embodiment, linkage means includes a substantially vertically disposed connector 46 which is attached to handle bar support upper portion 36b by a sleeve 48. Sleeve 48 may be moved and secured along the length of portion 36b to provide an adjustment in the positioning of handle bar 34. Sleeve 48 is joined to connector 46 by means of a flexible joint 50.

Linkage means, in this embodiment, includes a linkage arm 52 which is attached to the other end of vertical connector 46 and is pivotably secured to frame 12 by means of supports 54, which are located on tubes 18 and 20, and which are joined by a shaft 56, to provide a rotatable, or pivotable, mounting for linkage arm 54. A flexible joint 58 is used to secure connector 46 to linkage arm 52. The use of flexible joints 50 and 58 allow horizontal movement of connector 46 relative to linkage arm 52, thereby allowing rotation of handle bar support 36 relative to frame 12, and consequential steering of wheel 14.

A horizontal connector 60 extends from linkage arm 52 rearward under frame 12 to converting means 42, thereby completing the linkage between handle bar 34 and motion converting means 42.

Referring now to FIGS. 1, 2 and 3, motion converting means of the invention will be described in greater detail. Motion converting means includes a carrier 62 which is slidably mounted in a track 64 which is secured between tubes 18 and 20. Carrier 62 is a substantially box-like structure which includes a lower wall 62a, end walls 62b, 62c, and an upper wall 62d. A slide 62e is conformal with track 64 and provides for free oscillating movement of carrier 62 relative to track 64 and frame 12. Guards 65 are provided along either side of lower wall 62a and upper wall 62d and are also secured at the ends thereof to end walls 62b, 62c. Carrier 62 is attached to horizontal connector 60 by means of a pivotable joint 66.

A pair of oscillating gears 68, 70 are mounted on carrier 62 for movement therewith. In the preferred embodiment, gears 68 and 70 are formed of lengths of bicycle-type chain which are attached, at one end thereof, to the structure by means of pins 72, 74 and which are secured at the other end thereof by adjustable tensioners 76, 78, respectively. Tensioners 76, 78, also referred to herein as adjustment means, each include a first threaded member 80, which is connected to the other end of its respective oscillating gear and extends through an end wall of carrier 62, and a second threaded member, or nut 82, which may be turned, thereby increasing or decreasing tension on the oscillating gear.

Referring now to FIGS. 1 and 3, a pair of downwardly extending supports 84, 86 are attached to tubes 18, 20, respectively, and provide a mounting for a axle 88 which extends between supports 84 and 86 and is fixed thereto. A hub 90 is rotatably mounted on axle 88, and in turn, has ratcheted gears 92, 94 rotatably mounted thereon. The ratcheted gears are, in the preferred embodiment, o the type used on BMX bicycles, and are arranged on the hub to alternately drive the hub in one direction only. Each ratcheting gear is intermeshed with an oscillating gear such that, when carrier 62 is moved in the direction toward the front of vehicle 10, oscillating gear 68 drives ratcheted gear 94 to produce movement of hub 90 in the direction indicated by arrow 96. Oscillating gear 70 acts on ratcheted gear 92, however ratcheted gear 92 is in a free-wheel condition when rotated in a direction opposite arrow 96. When carrier 62 is shifted toward the rear of vehicle 10, gear 94 is in a free-wheel condition while gear 92 is rotated in the direction of arrow 96, thereby driving hub 90. Thus motion converting means 42 is operable to convert the oscillating motion of carrier 62 into rotary motion which is initially imparted to hub 90.

Means for transmitting the rotary motion of hub 90 are shown generally at 98. Means for transmitting, or transmitting means, includes a first sprocket 100 which is mounted on hub 90 and which is fixed thereto for rotation therewith. Chain means 102, which in the preferred embodiment, takes the form of a conventional bicycle chain, extends over first sprocket 100 and extends rearward to a second sprocket 104 which is connected to hub 16a of driving wheel 16.

A gearing mechanism may be provided to provide means for varying the relative rotational speeds between sprocket 100 and driving wheel 16. One device for providing such means for varying is a conventional three-speed hub, as depicted in FIG. 1, which has a cable 106 extending therefrom, the cable being enclosed in a sheath 108 which extends to the handle bars and a gear shift selector (not shown), which would be mounted on the handle bars. Another device for varying the relative rotational speeds would be the use of plural sprockets for one or both of the first and second sprocket means and the use of some form of derailleur to shift chain 102 to the appropriate sprockets.

To complete the description of vehicle 10, brakes are provided to stop the vehicle and include a front brake 110 and a rear brake 112. The brakes are connected by means of cables (not shown) to hand brake levers (not shown) which would be mounted on handle bar 34.

A slightly modified form of the vehicle of the invention is depicted in FIGS. 5 and 6 generally at 120. This form of the invention is constructed as a tricycle and has a frame 122 which has rear wheels 124, 126 mounted at the aft end thereof. Wheels 124, 126 are mounted on an axle 128 which has a sprocket 130 mounted thereon which is driven by a chain 102. A seat back 132 is mounted on frame 122 and enables the rider to sit in a somewhat reclined condition on the frame. Frame 122 may be of tubular construction or, as depicted, may be of a one piece, molded or machined construction.

Linear motion generating means in this embodiment is depicted at 132 and include a pair of movable arms 133a, 133b, each of which includes handle bars, or handle bar means, 134. A connecting bar 135 joins arms 133a, 133b. The arms include a handle bar support portion 136. Support 136 is attached to the vehicle front forks 138 at an articulated joint 140. Front forks 138 have a front, steerable wheel 14, mounted thereon. Wheel 14 is attached to frame 122 through a pivotable mount 142.

A downward extension of arm 133a, identified by reference numeral 144, serves as a vertical connector in this embodiment and is attached to a horizontal connector 146 by means of a universal joint 148. A foot pedal 150 is formed at the end of vertical connector 144 to enable the rider to create linear motion with both their arms and legs. Although horizontal connector 146 is attached to only one of arms 133a, 133b in this embodiment, those skilled in the art may easily devise ways of attaching horizontal connectors to both arms while providing free steering of wheel 14.

To complete the description of the vehicle, horizontal connector 146 is attached to motion converting means 42 by means of a second universal connector 152 which allows for free movement of horizontal connector 146 relative to vertical connector 144 and motion converting means 42. Vehicle 120 may be provided with braking devices and with gear shift devices, as desired.

As vehicle 120 is steered by means of handle bars 134, the vertical connectors 144 and foot pedals 150 will, on occasion come opposite the rear of front wheel 14. In the case of turns, and particularly in the case of left-hand turns with horizontal connectors located on right side of the vehicle, front fork 138 must have a sufficient rake in order to allow movement of linear motion generating means 132 relative to front wheel 14 of preventing contact between front wheel 14 and horizontal connector 146.

Operation of the vehicle 10 of the invention is accomplished by the rider grasping the handle bars while standing on foot board 30 and producing motion of upper handle bar support portion 36b relative to lower portion 36a, which results in substantially vertical movement of vertical connector 46, oscillating, pivotable movement of linkage arm 52 about shaft 56, and the resulting substantially horizontal movement of horizontal connector 60 under frame 12. Carrier 62 is oscillated fore-and-aft, resulting in rotary motion of hub 90, in the direction of arrow 96, ultimately producing rotation of the driving wheel. Exertion of pumping action on the handle bars by the rider will produce smooth generation of driving force for the vehicle.

Referring now to vehicle 120, the rider may exert an aft pumping motion on handle bar 134 and a forward pumping motion on foot pedals 150, which may of course, be combined with a forward pumping motion on handle bar 134. Additionally, the provision of toe clips on pedals 180 would enable the rider to exert fore-and-aft motion with both his arms and legs, resulting in greater motive power for the vehicle.

INDUSTRIAL APPLICABILITY

The invention is applicable for use as an exercise device and also has a means of transportation for a rider.

The invention is not restricted to the particular embodiments which have been described, since variations may be made therein without departing from the scope of the invention as defined in the appendant claims.

It is claimed and desired to secure as Letters Patent:

1. A drive mechanism for use in a human-powered vehicle wherein the vehicle has a frame and plural wheels mounted on the frame, for allowing rolling motion over a surface, wherein at least one of the wheels is a steerable wheel and at least one of the wheels is a driving wheel, comprising:
    linear motion generating means, operable by a human being, for generating a substantially linear, oscillating motion;
    motion converting means for converting said oscillating motion into rotary motion including a pair of oscillating gears, a carrier for said oscillating gears mounted on the frame for oscillating motion relative thereto, a hub rotatably mounted on the frame, a pair of ratcheting gears constructed and arranged on said hub to alternately drive said hub in one direction only, each ratcheting gear being intermeshed with an oscillating gear such that, with said carrier moved in one direction, one ratcheting gear drive said hub while the other ratcheting gear is in a free-wheel condition, and with said carrier moved in the other direction, the other ratcheting gear drives said hub while the one ratcheting gear is in a free-wheel condition, said carrier including a box like structure substantially enclosing said ratcheting gears, oscillating gears and said hub, and said oscillating gear comprises a length of chain secured to said structure, and adjustment means for adjusting tension on said chains, said adjustment means having an adjustable tensioner connected between at least one end of each chain and said carrier; and
    means for transmitting said rotary motion to the driving wheel.

2. The mechanism of claim 1 wherein said linear motion generating means is operably connected to the steerable wheel.

3. The mechanism of claim 1 wherein said linear motion generating means including handle bar means operably connected to the steerable wheel, said handle bar means being constructed and arranged for oscillatory motion relative to the frame.

4. The mechanism of claim 3 which further includes linkage means operably connected between said handle bar means and said motion converting means for transmitting said oscillating motion to said motion converting means.

5. The mechanism of claim 1 wherein said linear motion generating means includes foot pedal means constructed and arranged for oscillatory motion relative to the frame.

6. The mechanism of claim 5 which further includes linkage means operably connecting said foot pedal means to said motion converting means for transmitting said oscillating motion to said motion converting means.

7. The mechanism of claim 1 wherein said means for transmitting said rotary motion includes first sprocket means fixed on said hub, second sprocket means located on the driving wheel, and chain means connecting said first and said second sprocket means.

8. The mechanism of claim 7 wherein said means for transmitting further includes means for varying the relative rotational speeds between said first sprocket means and the driving wheel.

9. A drive mechanism for use in a human-powered vehicle, wherein the vehicle has an elongate frame and plural wheels mounted adjacent the ends thereof for allowing rolling over a surface, wherein at least one of the wheels is steerable and at least one of the wheels is a driving wheel, comprising:
    linear motion generating means including a handle bar and an articulated handle bar support for generating a substantially linearly, oscillating motion by oscillating movement of said handle bar support, said handle bar support being operably connected to the steerable wheel;
    motion converting means for converting said oscillating motion to a rotary motion including a pair of oscillating gears, a carrier for said oscillating gears mounted on the frame for oscillating motion relative thereto, a hub rotatably mounted on the frame, a pair of ratcheted gears constructed and arranged on said hub to alternately drive said hub in one direction only, each ratcheting gear being intermeshed with an oscillating gear such that, with said carrier moved in one direction, one ratcheting gear drives said hub while the other ratcheting gear is in a free-wheel condition, and with said carrier moved in the other direction, the other ratcheting gear drives said hub while the one ratcheting gear is in a free-wheel condition, said carrier including a box like structure substantially enclosing said ratcheting gears, oscillating gears and said hub, and said oscillating gear comprises a length of chain secured to said structure, and adjustment means for adjusting tension on said chains, said adjustment means having an adjustable tensioner connected between at least one end of each chain and said carrier;

linkage means including a substantially vertically disposed connector extending downward from said handle bar support, and a substantially horizontally disposed connector operably connected to said vertically disposed connector and extending rearward under the frame to said motion converting means; and means for transmitting said rotary motion of the driving wheel including first sprocket means drivingly connected to said motion converting means, second sprocket means located on the driving wheel, and chain means connecting said first and second sprocket means.

10. The mechanism of claim 9 which further includes a linkage arm connected to the lower end of said vertically disposed connector, said arm being pivotably connected to the frame, and said horizontally disposed connector being attached at one end thereof to said linkage arm.

11. The mechanism of claim 9 wherein said means for transmitting further includes means for varying the relative rotational speeds between said first sprocket means and the driving wheel.

12. The mechanism of claim 9 which further includes foot pedal means connected to said linear motion generating means for providing power to the vehicle.

13. The mechanism of claim 12 wherein said foot pedal means are mounted on said linkage means.

14. A drive mechanism for use in a human-powered vehicle, wherein the vehicle has an elongate frame and plural wheels, the wheels being mounted adjacent the ends of the frame, for allowing rolling of the vehicle over a surface, wherein at least one of the wheels is steerable and at least one of the wheels is a driving wheel, having a hub at the center thereof, comprising:

linear motion generating means including a handle bar and a handle bar support, said support having a lower portion and an articulated upper portion, said lower portion of the support being rotatably mounted on the frame and operably connected to the steerable wheel, and said upper, articulated portion being movable to produce oscillating motion;

motion converting means including a pair of oscillating gears, a carrier for said oscillating gears mounted on the frame for oscillating motion relative thereto, a hub rotatably mounted on the frame, a pair of ratcheting gears constructed and arranged on said hub to alternately drive said hub in direction only, each ratcheting gear being intermeshed with an oscillating gear such that, with said carrier moved in one direction, one ratcheting gear drives said hub while the other ratcheting gear is in a free-wheel condition, and with said carrier moved in the other direction, the other ratcheting gear drives said hub while the one ratcheting gear is in a free-wheel condition, wherein said carrier includes a box like structure substantially enclosing said ratcheting gears, oscillating gears and said hub, and said oscillating gear comprises a length of chain secured to said structure, said carrier further including adjustment means for adjusting the tension on said chains, said adjusting means having an adjustable tensioner connected between at least one end of each chain and said carrier;

linkage means including a substantially vertically disposed connector attached to and extending downward from said handle bar support upper portion, and a substantially horizontally disposed connector operably attached to said vertical connector and extending rearward under the frame to said motion converting means; and first sprocket means fixed on said hub, second sprocket means located on the driving wheel hub, and chain means trained over said first and second sprocket means.

15. The mechanism of claim 14 which further includes a linkage arm pivotably mounted on the frame and connected to the lower end of said vertically disposed connector, and said horizontally disposed connector is attached at one end thereof to said linkage arm.

* * * * *